United States Patent [19]

Landry

[11] Patent Number: 6,072,152
[45] Date of Patent: Jun. 6, 2000

[54] HEATER CONTROL DEVICE

[75] Inventor: Jean M. Landry, Cumberland, Canada

[73] Assignee: Fleetheet LLC, Springfield, Tenn.

[21] Appl. No.: 08/819,651

[22] Filed: Mar. 17, 1997

Related U.S. Application Data

[63] Continuation-in-part of application No. 08/500,498, Jul. 11, 1995, abandoned.

[30] Foreign Application Priority Data

Nov. 16, 1994 [CA] Canada ................................... 2135948

[51] Int. Cl.⁷ ................................. B60L 1/02; H05B 1/02
[52] U.S. Cl. .......................... 219/202; 219/205; 219/511
[58] Field of Search ..................... 210/202, 205, 210/523, 544, 536, 528, 522, 511; 123/142.5 E

[56] References Cited

U.S. PATENT DOCUMENTS

| | | |
|---|---|---|
| Re. 32,643 | 4/1988 | Bennett et al. . |
| 3,851,149 | 11/1974 | Daley ........................................ 219/528 |
| 3,973,102 | 8/1976 | Macklem ................................. 219/523 |
| 3,983,928 | 10/1976 | Barnes ........................................ 165/12 |
| 4,025,755 | 5/1977 | Shirley et al. ........................... 219/549 |
| 4,337,389 | 6/1982 | Bell . |
| 4,633,061 | 12/1986 | Arikawa . |
| 4,971,576 | 11/1990 | Thimmesch .............................. 439/502 |
| 5,017,758 | 5/1991 | Kirkman et al. ......................... 219/205 |
| 5,063,513 | 11/1991 | Shank ....................................... 219/205 |
| 5,210,393 | 5/1993 | Shier ......................................... 219/205 |
| 5,280,158 | 1/1994 | Matava ...................................... 219/205 |
| 5,352,862 | 10/1994 | Barr ........................................... 219/205 |

*Primary Examiner*—Teresa Walberg
*Assistant Examiner*—Thor Campbell
*Attorney, Agent, or Firm*—Dowell & Dowell, PC

[57] ABSTRACT

A control device for a heater in a vehicle. The control device has a thermostatic switch to turn the heater on when the air temperature drops to a first value that is around the temperature at which the engine will just easily start. A secondary heater is provided within the device, turned on when the heater is turned on, to cause the switch to turn the heater off when the switch is heated by the secondary heater to a second temperature that correlates to an outside temperature at which the engine starts more easily.

18 Claims, 2 Drawing Sheets

HEATER CONTROL DEVICE

This application is a continuation-in-part of application Ser. No. 08/500,498, filed Jul. 11, 1995 which application is now abandoned.

BACKGROUND OF THE INVENTION

1. Field of the Invention

This invention is directed toward a control device for controlling the operation of a heater in a vehicle.

The invention is also directed toward a method for controlling the operation of a heater in a vehicle.

2. Description of the Related Art Including Information Disclosed Under CFR §§ 1.97–1.99

Heaters for vehicles, such as a block heater which heats the engine of a parked vehicle so that it will start easily on cold mornings, are well known. The block heater is mounted on the engine and is plugged in to an external, electrical power source when needed. The block heater is normally plugged in, in the evening, and operates through the night so as to have the vehicle ready to start on a cold morning. Having the block heater on all night is inefficient however and relatively expensive since the vehicle engine is kept warm enough to start for most of the night even though it will normally be started only in the morning.

It is known to employ a timer with a block heater. The timer will be set to turn on the plugged-in block heater some time before the vehicle is needed in the morning so that the engine will have time to be warmed up enough to easily start. The use of timers reduces the power consumption. However timers are expensive. In addition, if the vehicle is needed in an emergency in the middle of the night the vehicle may not start because the timer has kept the heater turned off.

Block heaters are also known that use thermostats to turn the heater on and off to keep the engine warm enough to start without wasting electricity. The thermostat is integral with the heater since it must be mounted on the engine as well to be able to sense the temperature of the engine so as to be able to turn off the heater when the engine gets warm enough to start. It is often difficult to locate the thermostat in a place that makes efficient use of the heater. Normally, a thermostat cannot be added to an existing heater without having to replace it.

SUMMARY OF THE INVENTION

It is the purpose of the present invention to provide a control device for a heater for a vehicle that is relatively inexpensive to purchase and that also makes it relatively inexpensive to operate the heater. It is another purpose of the present invention to provide a control device that can be easily connected to existing heaters that are already installed.

It is another purpose of the present invention to provide a method for operating a heater for a vehicle in an inexpensive and efficient manner.

In accordance with the present invention, a control device is provided that is adapted to be electrically connected between the heater for the vehicle and the external power source for the heater. The control device normally cuts off the power to the heater when inserted into the circuit. The control device contains a thermostatic switch that closes to turn on the heater when the air temperature drops to a first temperature that requires the engine to be heated to easily start. The control device also contains means to cause the thermostatic switch to open to turn the heater off when the engine is more than warm enough to start. The means causing the switch to open preferably is a secondary heater that is automatically turned on when the thermostatic switch closes. The secondary heater is located closely adjacent to the switch and when turned on heats the switch to a temperature at which the switch opens to turn off the heater. The temperature is chosen to have the engine heated more than enough to have it easily start. Thus, on a very cold night the control device cycles turning the heater on and then off for periods of time which leave the engine just warm enough to easily start without using excessive power.

The control device preferably is purchased separately and inserted between the block heater and the power cord leading to the block heater. The control device can be mounted under the hood of the vehicle to protect it with just a plug end of the control device sticking out for connection to the power cord when needed.

The invention is broadly directed toward a control device for a heater in a vehicle. The control device has a thermostatic switch to turn the heater on when the air temperature drops to a first temperature that requires the environment of the heater to be heated. The control device also has separate means to cause the switch to be turned off when the environment reaches a predetermined temperature.

The invention is particularly directed toward a control device for a block heater for the engine of a vehicle. The control device has a thermostatic switch to turn the block heater on when the air temperature around the vehicle drops to a first temperature. The control device also has separate means to cause the thermostatic switch to be turned off when the block heater heats the engine to a predetermined temperature.

Preferably the control device has means for detachably, electrically connecting it between the heater in the vehicle and a power source to the heater.

The invention is also particularly directed toward a method for controlling a heater in a vehicle. The method comprises turning on the heater with a thermostatic switch when the air temperature around the vehicle drops to a first temperature while simultaneously turning on a secondary heater to heat the thermostatic switch. The thermostatic switch turns off both heaters when the switch is heated by the secondary heater until a desired temperature is reached by the environment of the heater.

DESCRIPTION OF THE PREFERRED EMBODIMENTS

Figure 1:
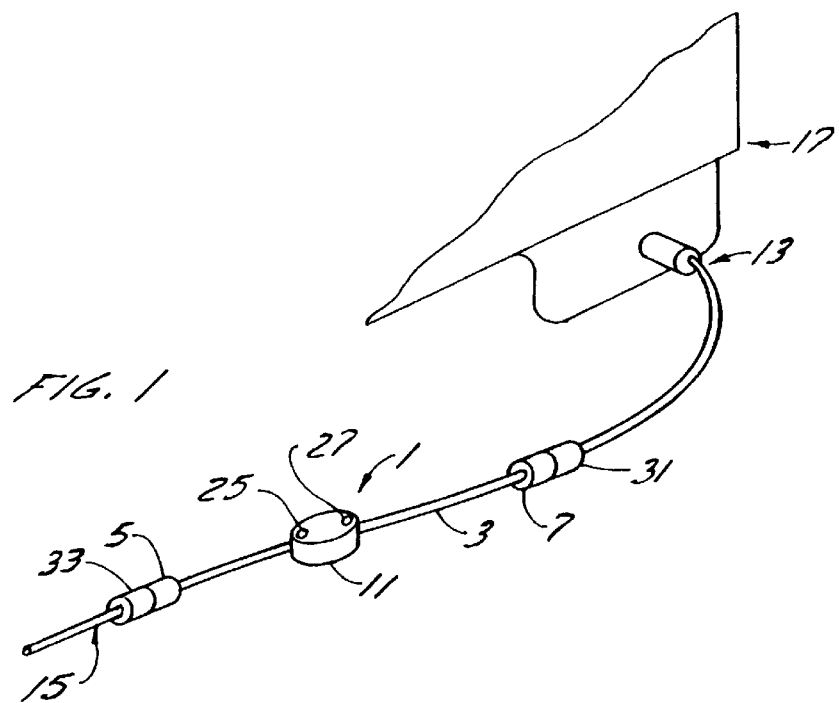
FIG. 1 is a schematic view of one embodiment of the control device of the present invention when in use.

The control device 1 of the present invention, as shown in FIG. 1, has a conductor 3 with an electrical male plug 5 at one end and an electrical female receptacle 7 at the other end. A casing 11 is located in the conductor 3 between the plug 5 and the receptacle 7. The casing 11 contains a thermostatic switch and a secondary heater as will be described. The control device 1 is adapted to be detachably, electrically mounted between a block heater 13 and a power cord 15 for the block heater that is plugged into an external power source (not shown). The block heater 13 is permanently mounted on a vehicle engine 17 in a position to heat the engine so that it will easily start in cold weather. The control device 1 is preferably located under the hood (not shown) of the vehicle with only its plug 5 outside the hood so that it is protected.

Figure 2:
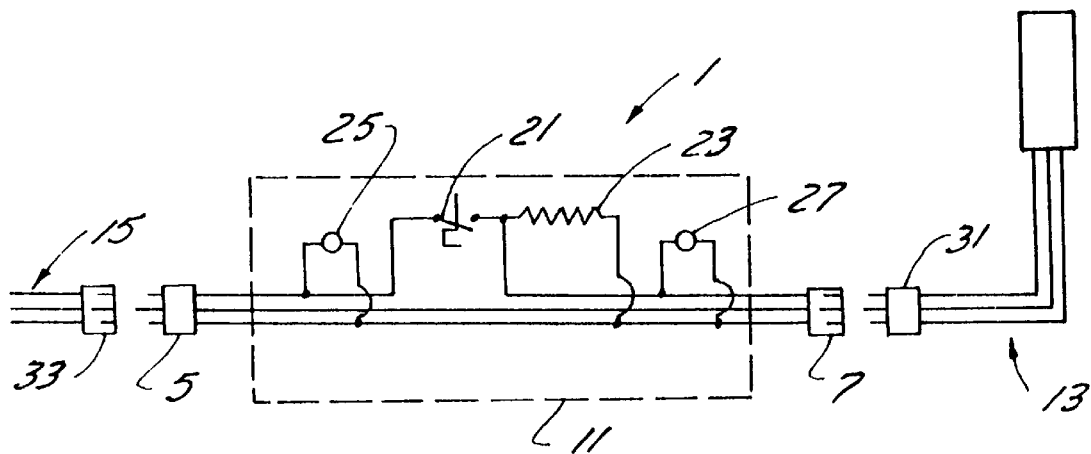
FIG. 2 is a circuit diagram of the control device shown in FIG. 1.

In more detail, as shown in FIG. 2, a thermostatic switch 21 is located in the casing 11. The switch 21 preferably is a disk type thermostatic switch. A suitable thermostatic switch is the "Thermodisk" thermostat, model 36TX01. A secondary, resistance heater 23 is also mounted in the casing 11 in series with the thermostatic switch 21 and located closely adjacent to it. The secondary heater 23 is located between the switch 21 and the receptacle 7.

A first indicator light 25, mounted on the casing 11, is located in front of the thermostatic switch 21. This first light shows that the power is on when the control device 1 is mounted between the vehicle heater 13 and the power cord 15. A second indicator light 27, of a different color from the first light 25 and also mounted on the casing 11, is located after the secondary heater 21. This second light shows when the circuit to the block heater 13 is closed.

In use, the control device 1 is plugged in between the male plug 31 on the block heater 13 via its female receptacle 7 and the female receptacle 33 on the power cord 15 via its male plug 5. When the control device 1 is plugged in, the thermostatic switch 21 is initially open and no power flows to the block heater 13 through the device. When the air temperature drops to a predetermined first temperature of around minus fourteen degrees Celsius, a temperature at which the engine starts to become difficult to start, the switch 21 closes to turn on the block heater 13. At the same time, the secondary heater 23 is also turned on within the casing 11 and begins to heat the air within the casing and thus the thermostatic switch. The block heater 13 heats the engine to a second temperature at which it will easily start. The secondary heater 23 is designed to open the thermostatic switch 21, and thus the block heater 23, when the engine has been heated to the second temperature. The casing 11 now begins to cool and when the first temperature is reached the power to the block heater 13 and the secondary heater 23 is turned on again. Thus the block heater 13 is cycled on and off throughout the night to keep the engine just warm enough that it will start easily.

The first predetermined temperature at which the switch closes is selected to be that temperature at which the vehicle engine will still just start easily enough. This temperature is around minus fourteen degrees Celsius but can range between minus twelve degrees and minus sixteen degrees. The thermostatic switch can be adjusted to the desired temperature values. The second temperature to which the engine is heated by the block heater, at which it will easily start, is around minus eleven degrees Celsius. The device is set to have the thermostatic switch heated, by the secondary heater, to a temperature high enough to open it when the block heater has heated the engine to the second temperature. Thus the switch 21 turns the heater on and off throughout a cold night keeping the engine just warm enough that it will always easily start. If the temperature never drops to minus fourteen degrees, the heater will not be used at all.

The first predetermined temperature and the second temperature to which the engine is heated given above are for a vehicle having a gasoline engine. For a vehicle having a diesel engine, the first predetermined temperature, at which the switch closes, would range between minus eight and minus sixteen degrees Celsius with the preferred temperature being around minus twelve degrees. The second temperature to which the engine is heated, at which it would easily start, would be around minus seven degrees Celsius. Again, the thermostatic switch can be set to operate at these desired temperature values for a diesel engine.

While the control device 1 has been described as having the first and second indicator lights 25, 27 on the casing 11, it can also have the first indicator light 25 on the plug 5 and the second indicator light 27 on the receptacle 7 instead of on the casing. The first light 25 would indicate that the power is on and the second light 27 would indicate that the circuit to the block heater is closed.

While the vehicle heater described has been the block heater the control device could control other heaters in the vehicle such as seat heaters or fans which heat up the interior of the vehicle.

Figure 3:
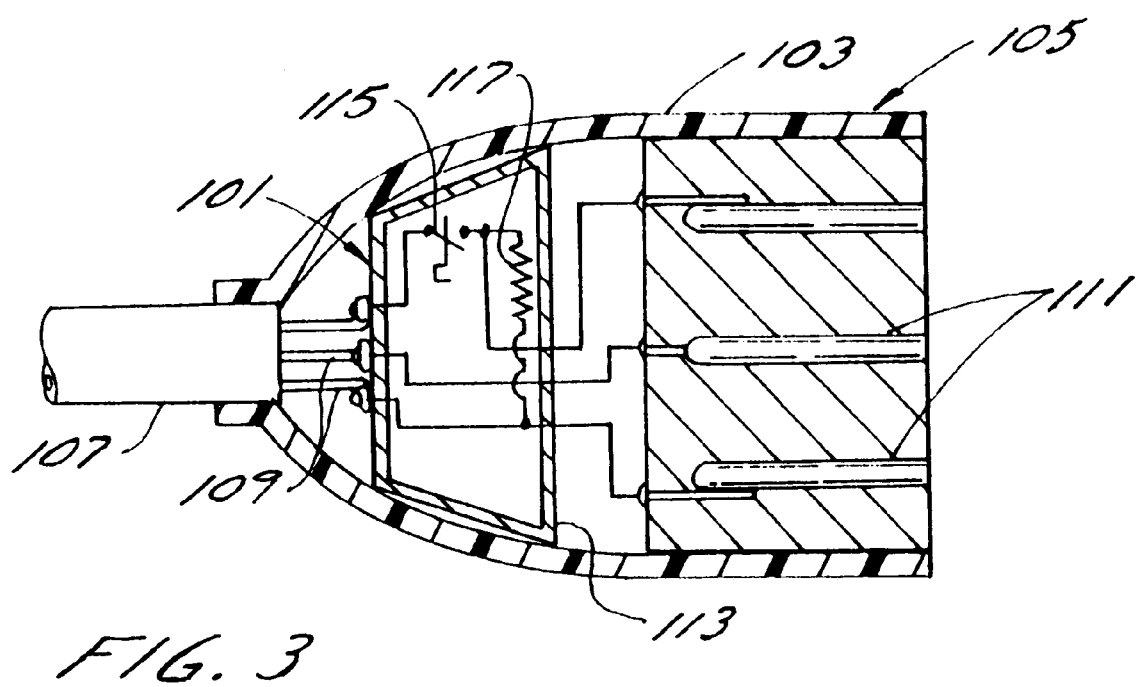
FIG. 3 is a schematic view of another embodiment of the control device.

The control device described above has been a separate entity. However, the control device could, with suitable miniaturization of the elements, if required, be combined with the female receptacle on the end of the power cord. The casing of the receptacle can be lengthened slightly, if required, to accommodate the control device. As shown in FIG. 3, the control device 101 is mounted within the casing 103 of the female receptacle 105 on the power cord 107. The control device 101 is directly connected, within the casing 103, between the conductors 109 in the power cord 107 and the plug contacts 111 in the receptacle 105. The control device 101 could include its own casing 113 within which is the thermostatic switch 115 and the heater 117 for the switch 115. The control device casing 113 could be dispensed with if the receptacle casing 103 provides sufficient protection for the switch 115 and the heater 117.

The power cord 107 is sold with the control device 101 forming an integral part of it. When the power cord 107 is connected between a block heater already installed on a vehicle, and an external power source, the control device 101 will automatically control the block heater. This power cord embodiment has been shown without the indicator lights but the lights could incorporated in the receptacle casing if desired.

While the power cord embodiment has been described with the control device mounted within the receptacle end of the power cord, it could also be mounted in the plug end of the power cord, provided the power cord is plugged into an outside power source receptacle where the control device is in an ambient air environment.

The control device could also be mounted within the plug end of the block heater so that the block heater could be sold with an integral control device. Alternatively, the control device could be mounted in the outer end of the block heater, that end of the block heater that is exposed to ambient air when the block heater is mounted on a vehicle.

I claim:

1. A control device for controlling a single electric block heater on a vehicle; the control device adapted to be mounted in the electric power supply to the single block heater so as to be spaced from the material heated by the block heater and to be located solely in an ambient air environment when so mounted; the control device having a single switch to control electrical power to the block heater; the single switch being a thermostatic switch set to close, to turn on the block heater, when the ambient air temperature drops to a first temperature at which the vehicle engine will just start; a secondary heater in the control device turned on by the thermostatic switch, when the thermostatic switch closes to heat the thermostatic switch; and the thermostatic switch set to be opened by the secondary heater to turn off the block heater when the vehicle engine has been heated by the block heater to a second temperature at which it easily starts whereby the device cycles the block heater to keep the vehicle engine at a temperature where it will start, the cycling dependent solely on the ambient air temperature.

2. A control device as claimed in claim 1 having an electrical plug at one end and an electrical receptacle at its other end allowing the control device to be detachably plugged in between a power cord and a plug on the block heater.

3. A control device as claimed in claim 1 wherein the control device is permanently mounted in the receptacle end of a power cord, the receptacle end of the power cord adapted to be connected to a plug on the block heater.

4. A control device as claimed in claim 1 wherein the control device is permanently mounted in a plug on the block heater.

5. A control device as claimed in claim 1 wherein the control device is permanently mounted on the exterior end of the block heater.

6. A control device as claimed in claim 1 wherein the vehicle has a gasoline engine and the first temperature is between minus twelve and minus sixteen degrees and the second temperature is around minus eleven degrees.

7. A control device as claimed in claim 1 wherein the vehicle has a diesel engine and the first temperature is between minus eight and minus sixteen degrees and the second temperature is around minus seven degrees.

8. A control device as claimed in claim 2 wherein the vehicle has a gasoline engine and the first temperature is between minus twelve and minus sixteen degrees and the second temperature is around minus eleven degrees.

9. A control device as claimed in claim 2 wherein the vehicle has a diesel engine and the first temperature is between minus eight and minus sixteen degrees and the second temperature is around minus seven degrees.

10. A control device as claimed in claim 3 wherein the vehicle has a gasoline engine and the first temperature is between minus twelve and minus sixteen degrees and the second temperature is around minus eleven degrees.

11. A control device as claimed in claim 3 wherein the vehicle has a diesel engine and the first temperature is between minus eight and minus sixteen degrees and the second temperature is around minus seven degrees.

12. A control device as claimed in claim 4 wherein the vehicle has a gasoline engine and the first temperature is between minus twelve and minus sixteen degrees and the second temperature is around minus eleven degrees.

13. A control device as claimed in claim 4 wherein the vehicle has a diesel engine and the first temperature is between minus eight and minus sixteen degrees and the second temperature is around minus seven degrees.

14. A control device as claimed in claim 5 wherein the vehicle has a gasoline engine and the first temperature is between minus twelve and minus sixteen degrees and the second temperature is around minus eleven degrees.

15. A control device as claimed in claim 5 wherein the vehicle has a diesel engine and the first temperature is between minus eight and minus sixteen degrees and the second temperature is around minus seven degrees.

16. A method for controlling a block heater in a vehicle comprising the steps of; locating a control device for the block heater in a power line leading to the block heater, the control device located in a position to be solely in an ambient air environment; a thermostatic switch in the control device turning on the block heater when the ambient air temperature drops to a first temperature where the vehicle engine will just start; having the thermostatic switch simultaneously turn on a secondary heater which will heat the thermostatic switch; the secondary heater heating the thermostatic switch to a temperature at which it will turn off after the block heater has heated the engine to a second temperature where it will more easily start.

17. A method as claimed in claim 16 wherein the vehicle has a gasoline engine and the first temperature is between minus twelve and minus sixteen degrees and the second temperature is around minus eleven degrees.

18. A method as claimed in claim 16 wherein the vehicle has a diesel engine and the first temperature is between minus eight and minus sixteen degrees and the second temperature is around minus seven degrees.

* * * * *